(12) United States Patent
Yeo et al.

(10) Patent No.: US 7,460,031 B2
(45) Date of Patent: Dec. 2, 2008

(54) METHOD AND APPARATUS FOR TRANSMITTING/RECEIVING MULTIMEDIA DATA

(75) Inventors: Chang Hoon Yeo, Gyeonggi-do (KR); Jae Young Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 11/508,854

(22) Filed: Aug. 24, 2006

(65) Prior Publication Data

US 2007/0050807 A1    Mar. 1, 2007

(30) Foreign Application Priority Data

Aug. 26, 2005    (KR) ..................... 10-2005-0079086

(51) Int. Cl.
*H03M 7/00* (2006.01)
(52) U.S. Cl. ........................................ 341/50; 455/557

(58) Field of Classification Search ............... 341/50, 341/51, 55; 455/557, 556, 74; 375/206, 375/355

See application file for complete search history.

(56) References Cited

U.S. PATENT DOCUMENTS

| 7,228,154 | B2 * | 6/2007 | Champion et al. | 455/557 |
| 2005/0136990 | A1 * | 6/2005 | Hardacker et al. | 455/572 |
| 2006/0092959 | A1 * | 5/2006 | Unger | 370/412 |
| 2007/0050807 | A1 * | 3/2007 | Yeo et al. | 725/20 |
| 2007/0186015 | A1 * | 8/2007 | Taft et al. | 710/16 |

* cited by examiner

*Primary Examiner*—Brian Young
(74) *Attorney, Agent, or Firm*—Birch, Stewart, Kolasch & Birch, LLP

(57) ABSTRACT

A method and apparatus for transmitting/receiving multimedia data are disclosed. The method for transmitting/receiving multimedia data includes the steps of generating a High Definition Multimedia Interface (HDMI)-type data of 4-bits, encoding the 4-bits HDMI-type data into 10-bits TERC4 (Transition-Minimized Differential Signaling Error Reduction Coding-4) encoded values, converting the 10-bits TERC4 encoded values into 8-bits DVI (Digital Video Interface)-type data, transmitting the 8-bits DVI-type data, receiving the 8-bits DVI-type data, converting the received 8-bits DVI-type data into 10-bits TERC4 encoded values, decoding the 10-bits TERC4 encoded values into 4-bits HDMI-type data, and receiving the decoded HDMI-type data.

15 Claims, 4 Drawing Sheets

FIG. 2

```
case (D3, D2, D1, D0):
    0000: q_out[9:0] = 0b1010011100;
    0001: q_out[9:0] = 0b1001100011;
    0010: q_out[9:0] = 0b1011100100;
    0011: q_out[9:0] = 0b1011100010;
    0100: q_out[9:0] = 0b0101110001;
    0101: q_out[9:0] = 0b0100011110;
    0110: q_out[9:0] = 0b0110001110;
    0111: q_out[9:0] = 0b0100111100;
    1000: q_out[9:0] = 0b1011001100;
    1001: q_out[9:0] = 0b0100111001;
    1010: q_out[9:0] = 0b0110011100;
    1011: q_out[9:0] = 0b1011000110;
    1100: q_out[9:0] = 0b1010001110;
    1101: q_out[9:0] = 0b1001110001;
    1110: q_out[9:0] = 0b0101100011;
    1111: q_out[9:0] = 0b1011000011;
endcase
```

METHOD AND APPARATUS FOR TRANSMITTING/RECEIVING MULTIMEDIA DATA

This application claims the benefit of Korean Patent Application No. 10-2005-0079086, filed on Aug. 26, 2005, which is hereby incorporated by reference as if fully set forth herein.

BACKGROUND OF THE INVENTION

1. Field of the Invention

The present invention relates to a method and apparatus for transmitting/receiving multimedia data, and more particularly to a method and apparatus for transmitting/receiving multimedia data, which can transmit/receive HDMI (High Definition Multimedia Interface) -type data via a multimedia interface.

2. Discussion of the Related Art

Generally, a High Definition Multimedia Interface (HDMI) acting as the next-generation digital multimedia interface is an interface type capable of simultaneously transmitting audio and video (A/V) signals, and encrypting the transmitted A/V data.

The HDMI has been widely used as an interface type capable of allowing an HD (High Definition) multimedia device to transmit/receive digital multimedia data.

The HDMI-type data employs a coded scheme different from TMDS (Transition-Minimized Differential Signaling) technology for use in conventional DVI (Digital Video Interface)-type data.

Therefore, the conventional digital multimedia transmission/reception device for transmitting/receiving the DVI-type data cannot transmit/receive HDMI-type data, and cannot transmit/receive the HDMI-type data without using an additional HDMI transmission/reception unit.

SUMMARY OF THE INVENTION

Accordingly, the present invention is directed to a method and apparatus for transmitting/receiving multimedia data that substantially obviates one or more problems due to limitations and disadvantages of the related art.

An object of the present invention is to provide a method and apparatus for transmitting/receiving digital multimedia data via a video-data interface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for transmitting multimedia data includes a first data converter for converting a High Definition Multimedia Interface (HDMI)-type multimedia data into a Digital Video Interface (DVI)-type data and a DVI transmitter for receiving the DVI-type data from the first data converter, and transmitting the received DVI-type data.

The first data converter includes an HDMI transmitter for transmitting 4-bits HDMI-type data; an encoder for receiving the 4-bits HDMI-type data from the HDMI transmitter, and encoding the 4-bits HDMI-type data into 10-bits TERC4 (Transition-Minimized Differential Signaling Error Reduction Coding-4) encoded values; and a data remapping unit for receiving the 10-bits TERC4 encoded values from the encoder, and converting the 10-bits TERC4 encoded values into 8-bits DVI-type data.

The first data converter is implemented with an FPGA (Field-Programmable Gate Array) module.

The data transmitted from the DVI transmitter is encoded by a TMDS (Transition-Minimized Differential Signaling) scheme.

In another aspect of the present invention, there is provided an apparatus for receiving multimedia data comprising: a Digital Video Interface (DVI) receiver for receiving DVI-type multimedia data and a second data converter for receiving the DVI-type multimedia data from the DVI receiver, and converting the received DVI-type multimedia data into HDMI (High Definition Multimedia Interface)-type data.

The second data converter includes a data remapping unit for receiving 8-bits DVI-type data from the DVI receiver, and converting the 8-bits DVI-type data into 10-bits TERC4 (Transition-Minimized Differential Signaling Error Reduction Coding-4) encoded values, a decoder for decoding the 10-bits TERC4 encoded values received from the data remapping unit into 4-bits HDMI-type data, and an HDMI receiver for receiving the 4-bits HDMI-type data from the decoder.

The second data converter is implemented with an FPGA (Field-Programmable Gate Array) module.

The data received in the DVI receiver is encoded by a TMDS (Transition-Minimized Differential Signaling) scheme.

In yet another aspect of the present invention, there is provided a method for transmitting multimedia data including the steps of converting a High Definition Multimedia Interface (HDMI)-type multimedia data into a Digital Video Interface (DVI)-type video data and transmitting the DVI-type video data.

The converting step includes the steps of transmitting 4-bits HDMI-type data, encoding the 4-bits HDMI-type data into 10-bits TERC4 (Transition-Minimized Differential Signaling Error Reduction Coding-4) encoded values and converting the 10-bits TERC4 encoded values into 8-bits DVI-type data.

The DVI-type video data of the step of the transmitting the DVI-type video data, is encoded by a TMDS (Transition-Minimized Differential Signaling) scheme.

In yet another aspect of the present invention, there is provided a method for receiving multimedia data including the steps of receiving Digital Video Interface (DVI)-type multimedia data and converting the received DVI-type multimedia data into HDMI (High Definition Multimedia Interface)-type data.

The converting step may include the steps of converting the DVI-type multimedia data of 8-bits into 10-bits TERC4 (Transition-Minimized Differential Signaling Error Reduction Coding-4) encoded values, decoding the 10-bits TERC4 encoded values into 4-bits HDMI-type data and receiving the 4-bits HDMI-type data.

The DVI-type multimedia data of the step is encoded by a TMDS (Transition-Minimized Differential Signaling) scheme.

In yet another aspect of the present invention, there is provided a method for transmitting/receiving multimedia data including the steps of generating a High Definition Multimedia Interface (HDMI)-type data of 4-bits, encoding the 4-bits HDMI-type data into 10-bits TERC4 (Transition-Minimized Differential Signaling Error Reduction Coding-4) encoded values, converting the 10-bits TERC4 encoded values into 8-bits DVI (Digital Video Interface) -type data; d) transmitting the 8-bits DVI-type data, receiving the 8-bits DVI-type data, converting the received 8-bits DVI-type data into 10-bits TERC4 encoded values, decoding the 10-bits TERC4 encoded values into 4-bits HDMI-type data and receiving the decoded HDMI-type data.

The HDMI-type data of the step is indicative of multimedia data.

The DVI-type data of the step is indicative of video data equipped with multimedia data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 exemplarily shows a process for encoding 4-bits HDMI-type data into TERC4 encoded values according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for transmitting/receiving multimedia data according to the present invention will hereinafter be described with reference to the accompanying drawings.

The HDMI-type data employs a TERC4 (TMDS Error Reduction Coding-4) coded scheme. The TERC4 scheme is an encoding method for rearranging 4-bits character data in the form of a 10-bits symbol, such that it can encrypt the HDMI-type data.

However, the above-mentioned TERC4 scheme is not applied to the DVI-type data.

In the case of transmitting the HDMI-type data using an apparatus (hereinafter referred to as a DVI transmitter) for transmitting the DVI-type data, an interface type of transmitting/receiving 8-bits DVI-type data is different from that of transmitting/receiving 4-bits HDMI-type data, such that a data island signal is applied to a video blank area of the DVI-type video data.

An apparatus for transmitting the HDMI-type data transmits the HDMI-type data using TERC4 codes. However, the DVI transmitter does not support the TERC4 coded scheme, such that a digital-type converter capable of converting the TERC4 coded values into video encoding values is additionally required.

Hereinafter, a process for converting 10-bits TERC4 coded values into 8-bits DVI-type data, or converting the 8-bits DVI-type data into the 10-bits TERC4 coded values is called a video remapping process. And a block for use in the above-mentioned process is called a data remapping unit.

Figure 1:
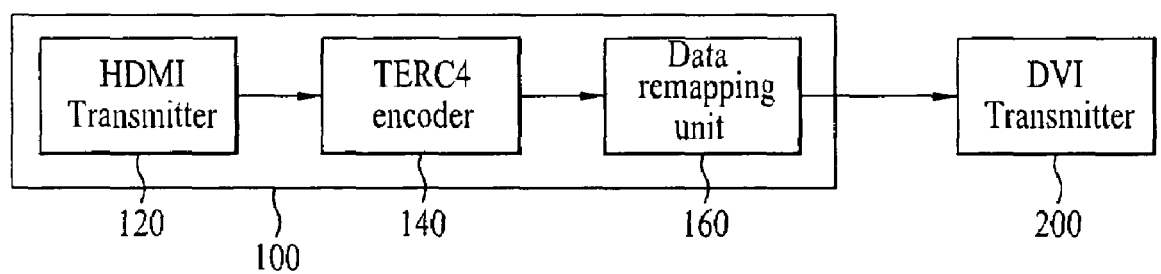
FIG. 1 is a block diagram illustrating a transmitter for transmitting digital multimedia data according to the present invention.

FIG. 1 is a block diagram illustrating a transmitter for transmitting digital multimedia data according to the present invention.

Operations of the apparatus for transmitting digital multimedia data (hereinafter referred to a digital multimedia data transmitter) according to the present invention will hereinafter be described with reference to FIG. 1.

Referring to FIG. 1, the digital multimedia data transmitter includes a first data converter 100 and a DVI transmitter 200. The first data converter 100 includes an HDMI transmitter 120, a TERC encoder 140, and a data remapping unit 160.

The HDMI transmitter 120 can output 4-bits HDMI-type digital data. The TERC4 encoder 140 converts the 4-bits HDMI-type digital data into 10-bits TERC4 encoded values, and outputs the 10-bits TERC encoded values.

FIG. 2 exemplarily shows a process for encoding 4-bits HDMI-type data into TERC4 encoded values according to the present invention.

Referring to FIG. 2, the TERC4 encoder 140 can convert the 4-bits HDMI-type data (D3, D2, D1, and D0) into 10-bits TERC encoded values using the process shown in FIG. 2.

The data remapping unit 160 converts the 10-bits TERC4 encoded data into 8-bits DVI-type data, such that it can transmit the HDMI-type data in the form of the DVI-type data.

The DVI transmitter 200 receives the DVI-type data from the data remapping unit 160, and transmits the received DVI-type data.

The DVI is indicative of an interface capable of transmitting/receiving 24-bits data composed of RGB signals, each of which includes 8-bits for each data channel. The interface can support the TMDS encoded data. Therefore, the DVI transmitter 200 repeats a transmission process for each channel, such that it transmits a total of 24-bits data to each of three channels (i.e., R, G, and B channels).

The first data transmitter 100 can be implemented with a digital module equipped with an FPGA (Field-Programmable Gate Array).

Figure 3:
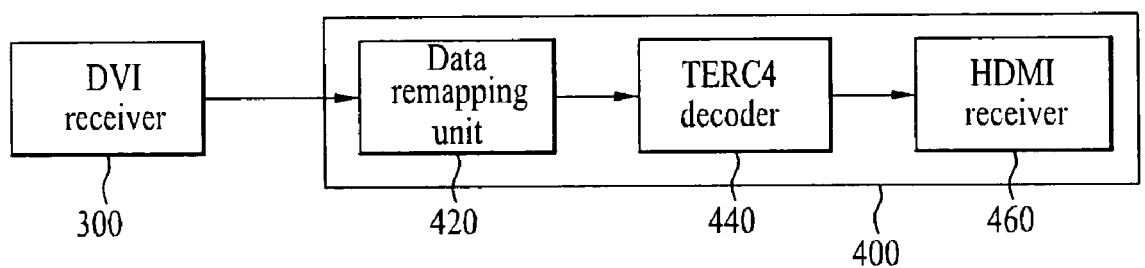
FIG. 3 is a block diagram illustrating a receiver for receiving digital multimedia data according to the present invention.

FIG. 3 is a block diagram illustrating a receiver for receiving digital multimedia data according to the present invention.

Operations of the digital multimedia data receiver will hereinafter be described with reference to FIG. 3.

Referring to FIG. 3, the digital multimedia data receiver according to the present invention includes a DVI receiver 300 and a second data converter 400. The second data converter 400 includes a data remapping unit 420, a decoder 440, and an HDMI receiver 460.

Operations of the above-mentioned digital multimedia data receiver shown in FIG. 3 are contrary to those of FIG. 1.

The DVI receiver 300 receives 8-bits TMDS encoded data. Although a conventional DVI is designed to receive only video data, it should be noted that the DVI receiver 300 of the digital multimedia data receiver can receive the DVI-type multimedia data equipped with audio data (i.e., audio-data embedded multimedia data of DVI type).

The data remapping unit 420 converts the 8-bits TMDS encoded data into 10-bits TERC4 data, and outputs the 10-bits TERC4 data.

The TERC4 decoder 440 performs operations opposite to those of the algorithm of FIG. 2, converts the 10-bits TERC4 encoded data into 4-bits HDMI-type data, and outputs the 4-bits HDMI-type data to the HDMI receiver 460.

If the above-mentioned process is repeated for each channel of three data channels (i.e., R, G, and B channels), the digital multimedia data receiver of FIG. 3 can receive the HDMI data using the DVI-type receiver.

The data remapping unit 420, the TERC4 decoder 440, and the HDMI receiver 460 can be implemented with FPGA-based digital modules, respectively.

Figure 4:
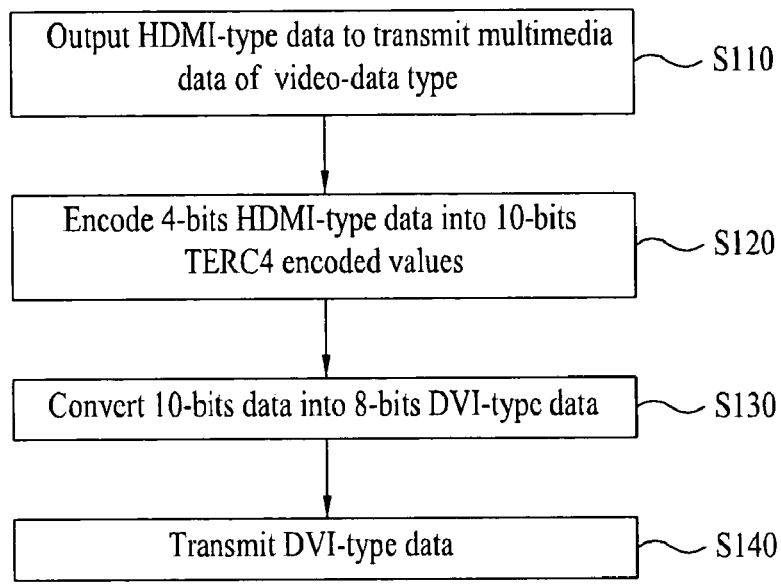
FIG. 4 is a flow chart illustrating a method for transmitting multimedia data according to the present invention.

FIG. 4 is a flow chart illustrating a method for transmitting multimedia data according to the present invention. A method for transmitting the multimedia data according to the present invention will hereinafter be described with reference to FIG. 4.

Referring to FIG. 4, the HDMI transmitter 120 outputs the HDMI-type data to transmit video-type multimedia data at step S110.

The TERC4 encoder 140 encodes the 4-bits HDMI-type data into 10-bits TERC4 encoded values at step S120.

The data remapping unit 160 converts the encoded 10-bits data into 8-bits DVI-type data at step S130.

The DVI transmitter 200 transmits the 8-bits s DVI-type data at step S140.

Therefore, according to the method depicted in FIG. 4, the HDMI-type multimedia data can be transmitted to an interface for the DVI-type video data.

Figure 5:
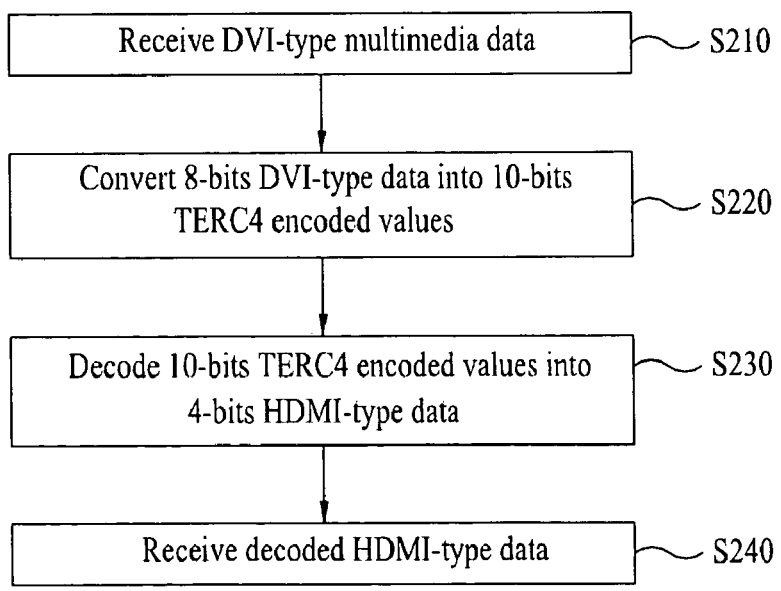
FIG. 5 is a flow chart illustrating a method for receiving multimedia according to the present invention.

FIG. 5 is a flow chart illustrating a method for receiving multimedia according to the present invention. A method for receiving the multimedia data according to the present invention will hereinafter be described with reference to FIG. 5.

The DVI receiver 300 receives the DVI-type multimedia data at step S210.

The data remapping unit 420 converts the received 8-bits DVI-type data into 10-bits TERC4 encoded values at step S220.

The TERC4 decoder 440 decodes the 10-bits TERC4 encoded values into 4-bits HDMI-type data at step S230.

The HDMI receiver 460 receives the decoded HDMI data at step S240.

Therefore, according to the method depicted in FIG. 5, the digital multimedia data receiver can receive the HDMI-type data converted into DVI-type data.

As apparent from the above description, a method and apparatus for transmitting/receiving multimedia data according to the present invention can transmit/receive HDMI-type data to/from a DVI-type digital interface.

The apparatus for transmitting/receiving multimedia data according to the present invention can transmit/receive HDMI-type data using a conventional transmission/reception unit equipped with a DVI-type interface, such that there is no need for the apparatus to additionally include a transmission/reception unit equipped with the HDMI-type interface.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for transmitting multimedia data, comprising:
    a data converter configured to convert a High Definition Multimedia Interface (HDMI)-type multimedia data into a Digital Video interface (DVI)-type data; and
    a DVI transmitter configured to receive the DVI-type data from the data converter, and transmitting the received DVI-type data, wherein the data converter includes:
    an HDMI transmitter configured to transmit 4-bits HDMI-type data;
    an encoder configured to receive the 4-bits HDMI-type data from the HDMI transmitter, and to encode the 4-bits HDMI-type data into 10-bits TERC4 (Transition-Minimized Differential Signaling Error Reduction Coding-4) encoded values; and
    a data remapping unit configured to receive the 10-bits TERC4 encoded values from the encoder, and converting the 10-bits TREC4 encoded values into 8-bits DVI-type data.

2. The apparatus according to claim 1, wherein the data converter is implemented with an FPGA (Field-Programmable Gate Array) module.

3. The apparatus according to claim 1, wherein the data transmitted from the DVI transmitter is encoded by a TMDS (Transition-Minimized Differential Signaling) scheme.

4. An apparatus for receiving multimedia data, comprising:
    a Digital Video Interface (DVI) receiver configured to receive DVI-type multimedia data; and
    a data converter configured to receive the DVI-type multimedia data from the DVI receiver, and converting the received DVI-type multimedia data into HDMI (High Definition Multimedia Interface)-type data, wherein the data converter includes:
    a data remapping unit configured to receive 8-bits DVI-type data from the DVI receiver, and to convert the 8-bits DVI-type data into 10-bits TERC4 (Transition-Minimized Differential Signaling Error Reduction Coding-4) encoded values;
    a decoder configured to decode the 10-bits TERC4 encoded values received from the data remapping unit into 4-bits HDMI-type data; and
    an HDMI receiver configured to receive the 4-bits RDMI-type data from the decoder.

5. The apparatus according to claim 4, wherein the data converter is implemented with an FPGA (Field-Programmable Gate Array) module.

6. The apparatus according to claim 4, wherein the data received in the DVI receiver is encoded by a TMDS (Transition-Minimized Differential Signaling) scheme.

7. A method for transmitting multimedia data, comprising the steps of:
    transmitting 4-bits HDMI (High Definition Multimedia Interface)-type data;
    encoding the 4-bits HDMI-type data into 10-bits TERC4 (Transition-Minimized Differential Signaling Error Reduction Coding-4) encoding values;
    converting the 10-bits TERC4 encoded values into 8-bits DVI (Digital Video Interface)—type data; and
    transmitting the 8-bits DVI-type data.

8. The method according to claim 7, wherein the DVI-type video data of the transmitting step is encoded by a TMDS (Transition-Minimized Differential Signaling) scheme.

9. A method for receiving multimedia data comprising the steps of:
    a) receiving Digital Video Interface (DVI)-type multimedia data; and
    b) converting the DVI-type multimedia data of 8-bits into 10-bits TERC4 (Transition-Minimized Differential Signaling Error Reduction Coding-4) encoding values;
    c) decoding the 10-bits TERC4 encoded values into 4-bits HDMI-type data; and
    d) receiving the 4-bits HDMI-type data.

10. The method according to claim 9, wherein the DVI-type multimedia data of the converting step is encoded by a TMDS (Transition-Minimized Differential Signaling) scheme.

11. A method for transmitting/receiving multimedia data comprising the steps of:
- generating a High Definition Multimedia Interface (HDMI)-type data of 4-bits;
- encoding the 4-bits HDMI-type data into 10-bits TERC4 (Transition-Minimized Differential Signaling Error Reduction Coding-4) encoded values;
- converting the 10-bits TERC4 encoded values into 8-bits DVI (Digital Video Interface)—type data;
- transmitting the 8-bits DVI-type data;
- receiving the 8-bits DVI-type data;
- converting the received 8-bits DVI-type data into 10-bits TERC4 encoded values;
- decoding the 10-bits TERC4 encoded values into 4-bits HDMI-type data; and
- receiving the decoded HDMI-type data.

12. The method according to claim 11, wherein the HDMI-type data of the generating step is indicative of multimedia data.

13. The method according to claim 11, wherein the DVI-type data of the receiving step is indicative of video data equipped with multimedia data.

14. An apparatus for transmitting multimedia data, comprising:
- an HDMI transmitter configured to transmit HDMI-type data;
- an encoder configured to receive the HDMI-type data from the HDMI transmitter, and to encode the HDMI-type data into TERC4 (Transition-Minimized Differential Signaling Error Reduction Coding-4) encoded values;
- a data remapping unit configured to receive the TERC4 encoded values from the encoder, and to convert the TERC4 encoded values into DVI-type data; and
- a DVI transmitter configured to receive the DVI-type data from the data remapping unit, and to transmit the received DVI-type data.

15. An apparatus for receiving multimedia data, comprising:
- a Digital Video Interface (DVI) receiver configured to receive DVI-type data;
- a data remapping unit configured to receive the DVI-type data from the DVI receiver, and to convert the DVI-type data into TERC4 (Transition-Minimized Differential Signaling Error Reduction-Coding4) encoded values;
- a decoder configured to decode the TERC4 encoded values received from the data remapping unit into HDMI-type data; and
- an HDMI receiver configured to receive the HDMI-type data from the decoder.

* * * * *